United States Patent
Berndt et al.

(10) Patent No.: US 7,590,849 B2
(45) Date of Patent: Sep. 15, 2009

(54) METHOD AND CONTROL PROGRAM FOR OPERATING A COMMUNICATION TERMINAL FOR PACKET-ORIENTED DATA TRANSMISSION

(75) Inventors: Stefan Berndt, Bönen (DE); Bruno Bozionek, Borchen (DE); Bernd Hinz, Rheda-Wiedenbrück (DE); Thorsten Laux, Paderborn (DE); Ralf Neuhaus, Lünen (DE); Christian Scheering, Bielefeld (DE); Rainer Uecker, Mülheim (DE); Rainer Zimmermann, Paderborn (DE)

(73) Assignee: Siemens Aktiengesellshaft, Munich (DE)

( * ) Notice: Subject to any disclaimer, the term of this patent is extended or adjusted under 35 U.S.C. 154(b) by 628 days.

(21) Appl. No.: 10/550,585

(22) PCT Filed: Mar. 24, 2004

(86) PCT No.: PCT/EP2004/003131

§ 371 (c)(1),
(2), (4) Date: Sep. 22, 2005

(87) PCT Pub. No.: WO2004/088920

PCT Pub. Date: Oct. 14, 2004

(65) Prior Publication Data

US 2006/0190727 A1    Aug. 24, 2006

(30) Foreign Application Priority Data

Mar. 31, 2003    (DE) ................. 103 14 559

(51) Int. Cl.
*H04L 9/32* (2006.01)
(52) U.S. Cl. .................... 713/176; 726/12
(58) Field of Classification Search ............. None
See application file for complete search history.

(56) References Cited

U.S. PATENT DOCUMENTS

| 6,230,281 | B1 | 5/2001 | Brodfuhrer et al. | |
|---|---|---|---|---|
| 2001/0039197 | A1* | 11/2001 | Barkan | 455/561 |
| 2003/0167343 | A1* | 9/2003 | Furuno | 709/244 |
| 2006/0107060 | A1* | 5/2006 | Lewis et al. | 713/176 |

FOREIGN PATENT DOCUMENTS

WO    WO 01/31848 A2    5/2001

\* cited by examiner

*Primary Examiner*—William R Korzuch
*Assistant Examiner*—Brett Squires

(57) ABSTRACT

In order to operate a communication terminal for packet-oriented data transmission, at least one piece of status information is stored, for a communication terminal, in a memory unit associated with the communication terminal. Said status information is provided with a digital signature that is calculated from the status information by means of a private key for an asymmetrical encoding method associated with a first control unit associated with the communication terminal, for the resolution and/or conversion of network addresses. If the first control unit fails, a request is transmitted comprising the status information and the digital signature to associate the communication terminal with at least one second control unit, and the digital signature is checked. In the event of a positive check result, the communication terminal is associated with the second control unit.

20 Claims, 2 Drawing Sheets

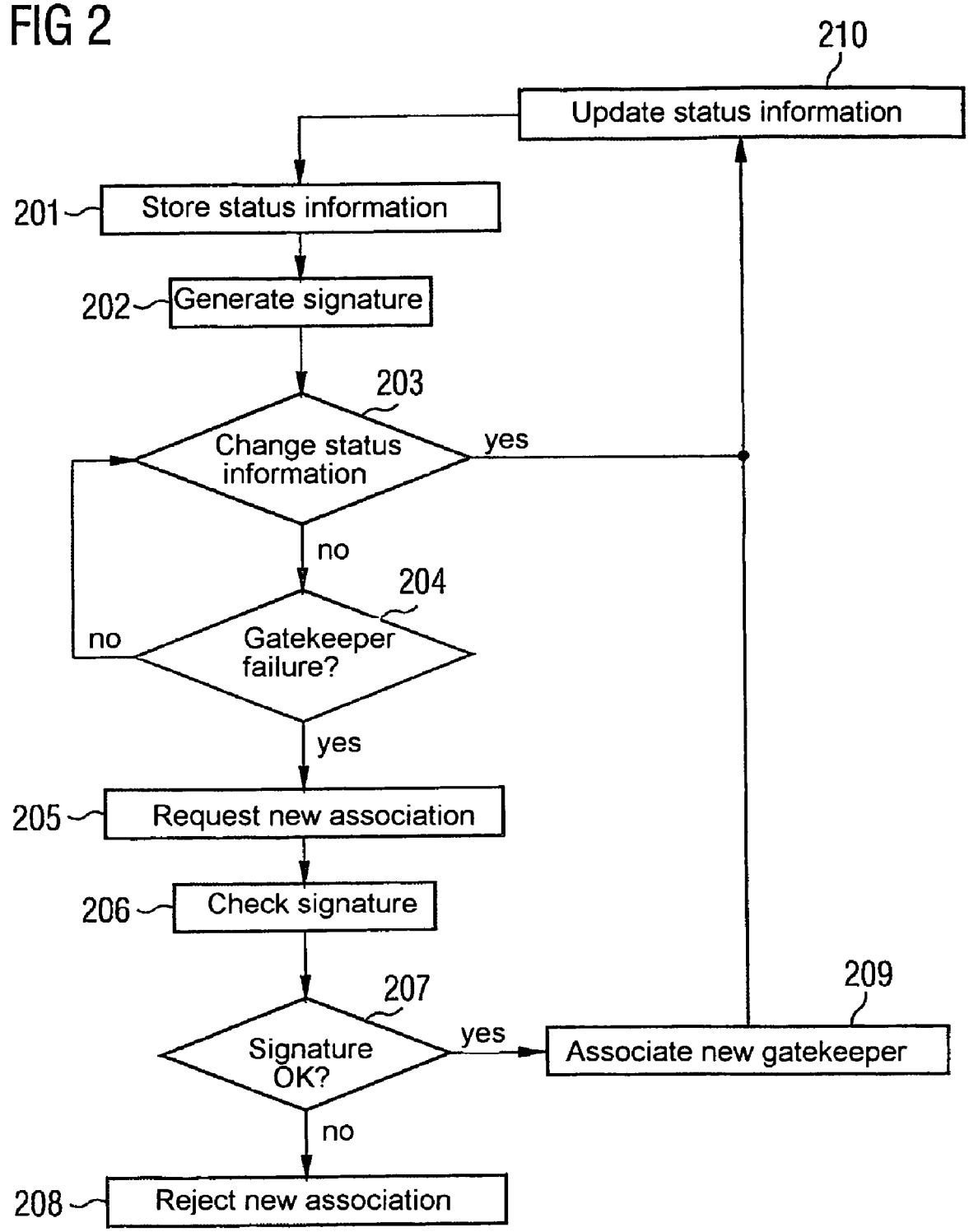

METHOD AND CONTROL PROGRAM FOR OPERATING A COMMUNICATION TERMINAL FOR PACKET-ORIENTED DATA TRANSMISSION

CROSS REFERENCE TO RELATED APPLICATIONS

This application is the US National Stage of International Application No. PCT/EP2004/003131, filed Mar. 24, 2004 and claims the benefit thereof. The International Application claims the benefits of German application No. 10314559.1, filed Mar. 31, 2003, both applications are incorporated by reference herein in their entirety.

FIELD OF INVENTION

The invention relates to a method and a control program for operating a communication terminal for packet-oriented data transmission.

SUMMARY OF THE INVENTION

The Internet Protocol (IP) for packet-oriented, connectionless data transmission is not only used purely for data transfer. Due to the increasing installation of IP-based networks, such as Intranets and Extranets, the use of the Internet Protocol is an interesting and cost-effective alternative to traditional communication structures for voice and image signal transmission also. Voice signal transmission using the Internet Protocol, Voice-over-IP (VoIP), competes in particular with classical, connection-oriented voice networks. With regard to the use of the Internet Protocol for voice signal transmission, its real-time behavior is of key importance. This real-time behavior is determined by the minimization of data packet losses and delay times, especially as users only accept minimal delays in the case of voice signal transmission.

The incorporation and use of existing telecommunication systems will also be critical for the acceptance of Voice-over-IP. On the user side, there is in fact major economic interest in the continued use of previous, conventional telecommunication systems including all the familiar features. Voice-over-IP is planned as the replacement for conventional PBX technology and provides a basis for the continuing integration of voice, data and video services, for example in the context of multimedia conferences, application sharing, and call center applications. As a result of the simplification of operating functions for data and voice, potential synergies can be exploited. Moreover, Voice-over-IP makes standardized environments possible with interfaces to conventional telecommunication systems, including public telecommunication networks.

Possible application scenarios for Voice-over-IP in an Intranet envision site-based IP telephone gateways, over which calls are routed from a telecommunication system. Such a gateway has the task of supporting signaling, standard protocols, and also vendor-specific protocols. Currently, Voice-over-IP—including integration in existing telecommunications systems—still displays a number of weak spots with regard to signaling, available features, and suitable network management systems. In the case of the latter, requirements include overall monitoring and management of formerly separate voice and data communication.

In many VoIP telephone networks, VoIP terminals hold data about their status in a memory associated with the respective VoIP terminal. The unit's status includes, for example, information such as directory number, programmed key assignments, and activated features. Usually, a control unit known as a gatekeeper is associated with a VoIP terminal in VoIP telephone networks, which carries out the onward switching of call signaling and also the resolution or conversion of network addresses or telephone numbers, for example. As a rule, therefore, gatekeepers are provided primarily for access authorizations and security aspects. Additionally, gatekeepers can also be allocated tasks in the fields of charge logging, charge allocation or bandwidth management for the purposes of ensuring a prescribed quality of service.

If a gatekeeper in a VoIP telephone network fails, VoIP terminals are affected in particular, losing their association in the VoIP telephone network as a result. The re-association of the affected VoIP terminals with an alterative gatekeeper represents a security problem in this connection, since the affected VoIP terminals have usually not yet been registered by the alternative gatekeeper.

The object underlying the present invention is therefore to specify a method for operating a communication terminal for packet-oriented data transmission and also an efficient implementation of the method, which enables the secure re-association of the communication terminal with an alternative control unit following the failure of a previously associated control unit.

This object is achieved by the claims. Advantageous developments of the present invention are specified in the dependent claims.

An essential aspect of the present invention consists in the fact that a piece of status information stored, for a communication terminal, in an associated memory unit is provided with a digital signature. The digital signature is calculated from the status information by means of a private key for an asymmetrical encoding method, which is associated with a first control unit associated with the communication terminal for the resolution and/or conversion of network addresses. If the first control unit fails, a request is transmitted comprising the status information and the digital signature to associate the communication terminal with at least one second control unit and the digital signature is checked, for example by the second control unit. In the event of a positive check result, the communication terminal is associated with the second control unit. The unauthorized infiltration of a VoIP terminal at a control unit provided for association, such as a gatekeeper, can be prevented in this way.

In the following, the present invention is explained in detail using an exemplary embodiment on the basis of the drawing.

BRIEF DESCRIPTION OF THE DRAWINGS

FIG. 2 shows a flowchart for a method and control program for operating a communication terminal for packet-oriented data transmission.

DETAILED DESCRIPTION OF INVENTION

Figure 1:
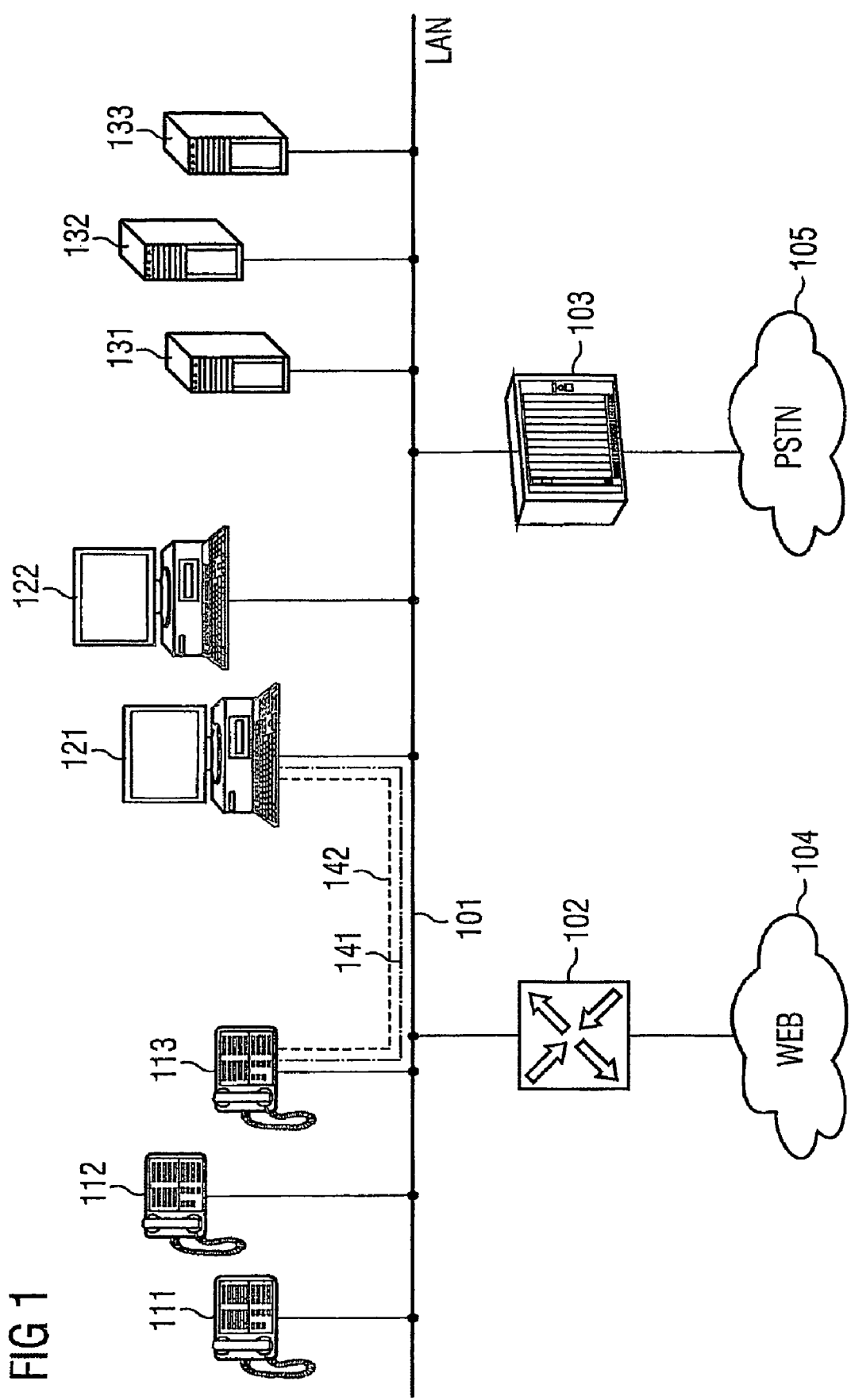
FIG. 1 shows a schematic representation of an application environment of the present invention.

The application environment of the present invention represented schematically in FIG. 1 includes a local packet-switching data network 101, which interconnects a plurality of VoIP telephones 111-113, PC-based communication terminals 121-122, gatekeepers 131-133, a router 102, and a gateway 103. The VoIP telephones 111-113 and the PC-based communication terminals 121-122 represent communication terminals for packet-oriented data transmission, where the VoIP telephones 111-113 are only used for voice signal transmission.

The gatekeepers 131-133 are provided as central control elements for the forwarding of call signaling and also the resolution and/or conversion of telephone numbers and network addresses. Apart from this, the gatekeepers 131-133 log charges and allocate them to network users and/or services.

The gatekeepers 131-133 represent important components for Voice-over-IP, since software for the management of zones and call services is installed on them and runs there.

The router 102 is provided as a switching element between the local packet-switching data network 101 and a further IP-based network 104, such as the Internet, and connects the local, IP-based packet-switching data network 101 and the further IP-based network 104 to each other on the network layer as defined in the OSI reference model. The router 102 chiefly carries out tasks in the field of protocol conversion and data rate adaptation.

The gateway 103 includes hardware and software in order to interconnect networks of different types. In the present case, the gateway 103 connects a public telephone network 105 to the local, IP-based packet-switching data network 101 by means of protocol conversion. In particular, the gateway 103 has the task of transmitting messages from one network to another, which primarily requires a communication protocol conversion. Furthermore, the gateway 102 is capable of completely resolving protocols and represents an addressable network node both from the viewpoint of the public telephone network 105 and also from the viewpoint of the local packet-switching data network 101. A complete protocol conversion carried out by the gateway 103 includes conversion of addresses and formats, conversion of the coding, buffer storage of data packets, confirmation of packets, flow control, and also speed adaptation.

Status information is stored, for each of the communication terminals 111-113, 121-122, in a memory unit of the respective communication terminal. This status information includes, for example, call lists, redirections, programmed key assignments and activated features, and value-added services. In this respect, the status information is managed in the form of data containers in the respective memory unit and is continuously updated by a gatekeeper 131 to 133 associated with the respective communication terminal 111-113, 121-122. The storage of the status information corresponds to Step 201 in the flowchart shown in FIG. 2, while the updating of the status information corresponds to Step 210.

Furthermore, a digital signature is generated (Step 202), with which the respective status information is provided. The digital signature is calculated respectively from the status information stored in the respective memory by means of a private key for an asymmetrical encoding method and stored in the respective memory unit together with the status information. In the process, the respective digital signature is calculated by means of the private key which is associated with the gatekeeper 131-133 associated with the respective communication terminal 111-113, 121-122. A public key for checking a digital signature of a respective gatekeeper 131-133 is deposited in a form capable of being interrogated in the respective other gatekeepers. In general, the public keys are deposited in such a way that said public keys are available to all gatekeepers within an IP telephone domain.

The continuous updating of the status information is reflected in Step 203, in which an inquiry is made as to whether there is a change to the status information, and in Step 210, in which a piece of status information is updated where relevant. The failure of a gatekeeper 131 initially associated with a communication terminal 111-113, 121-122 is established by the communication terminals affected by the failure whenever a cyclical updating of status information no longer functions. As a result, the communication terminals are capable of recognizing the failure of a gatekeeper (Step 204).

If the initially associated gatekeeper 131 actually fails, then the communication terminals affected by the failure transmit a message containing a request to associate the respective communication terminal with at least one alternative gatekeeper 132-133. The message containing the request to associate the communication terminals affected by the failure includes the status information together with the digital signature stored in the respective communication terminals. A list containing alternative gatekeepers should preferably be stored additionally in each communication terminal in order that communication terminals affected by the failure of a gatekeeper can select an alternative gatekeeper in an evenly distributed manner. An automatic load distribution is ensured in this way. The transmission of the message containing a request to associate an alternative gatekeeper corresponds to Step 205 of the flowchart shown in FIG. 2.

The alternative gatekeeper 132-133, which has received a message containing a request to associate a communication terminal, firstly checks the digital signature included in the message (Step 206). If the digital signature is calculated from a hash value ascertained for the status information for example, a hash value is calculated for the status information transmitted by a communication terminal by one of the alternative gatekeepers 132-133 for the purposes of checking the digital signature and said hash value is compared for a match with a digital signature decoded by using a public key associated with the failed gatekeeper 131. A message digest no. 5 algorithm (MD5) can be used for calculating the digital signature, for example. To complete the checking of the digital signature, the check result is interrogated, as reflected in Step 207 of the flowchart shown in FIG. 2.

If the digital signature cannot be checked successfully, the re-association of the respective communication terminal affected by the failure of the previously associated gatekeeper 131 with an alternative gatekeeper 132-133 is rejected (Step 208). In the event of a positive check result, the communication terminal is associated with the respective alternative gatekeeper 132-133 (Step 209) and the status information for the communication terminal is updated where relevant (Step 210).

The method described for operating a communication terminal for packet-oriented data transmission can be implemented in the form of a control program, for example. In the case of a local implementation of the method, control programs are installed in the communication terminals which can be loaded into a working memory of a respective PC-based communication terminal and which display blocks of code, in the execution of which the steps described in the foregoing are carried out and/or initiated if the respective control program is running on the respective PC-based communication terminal. Steps for checking a digital signature and for associating a new gatekeeper can be carried out by control programs installed in the alternative gatekeepers.

The present invention is not limited to the exemplary embodiment described here.

The invention claimed is:

1. A method for operating a communication terminal for packet-oriented data transmission, the method comprising:

depositing a public key of a first control unit such that at least one second control unit is able to access the public key;

providing status information to a communication terminal, the status information comprising a digital signature calculated from status information of the communication terminal by a private key of the first control unit, the first control unit being associated with the communication terminal for the resolution and/or conversion of network addresses;

storing the status information in a memory unit associated with the communication terminal;

transmitting a request to associate the communication terminal with at least one second control unit if the first control unit fails, the request comprising the status information and the digital signature;

checking the digital signature with the at least one second control unit, the at least one second control unit configured to access the public key of the first control unit to check the digital signature; and associating the communication terminal with the at least one second control unit if the checking of the digital signal results in a positive check result.

2. The method according to claim 1, wherein the status information of the communication terminal is updated at least at a predefinable time upon initiation of the first or at least one second control unit.

3. The method according to claim 2, wherein the digital signature is calculated from a hash value ascertained for the status information of the communication terminal.

4. The method according to claim 2, wherein a hash value is calculated for the status information of the communication terminal by the at least one second control unit for checking the digital signature and said hash value is compared for a match with a digital signature decoded by using the public key of the first control unit.

5. The method according to claim 3, wherein the hash value is calculated for the status information of the communication terminal for checking the digital signature, and wherein the hash value is compared for a match with a digital signature decoded by using the public key of the first control unit.

6. The method according to claim 3, wherein a message digest no. 5 algorithm is used to calculate the digital signature.

7. The method according to claim 4, wherein a message digest no. 5 algorithm is used to calculate the digital signature.

8. The method according to claim 5, wherein the message digest no. 5 algorithm is used to calculate the digital signature.

9. The method according to claim 1, wherein the digital signature is calculated from a hash value ascertained for the status information of the communication terminal.

10. The method according to claim 9, wherein the hash value is calculated for the status information of the communication terminal for checking the digital signature, and wherein the hash value is compared for a match with a digital signature decoded by using the public key of the first control unit.

11. The method according to claim 9, wherein a message digest no. 5 algorithm is used to calculate the digital signature.

12. The method according to claim 10, wherein a message digest no. 5 algorithm is used to calculate the digital signature.

13. The method according to claim 1, wherein a hash value is calculated for the status information of the communication terminal by the at least one second control unit for checking the digital signature and said hash value is compared for a match with a digital signature decoded by using the public key of the first control unit.

14. The method according to claim 13, wherein a message digest no. 5 algorithm is used to calculate the digital signature.

15. The method according to claim 1 wherein the transmission of the request to associate the communication terminal with the at least one second control unit is at least partially defined by a list identifying a plurality of second control units, the list being accessible to the communication terminal.

16. The method of claim 15 wherein the list is stored in the memory of the communication terminal.

17. A communication terminal comprising at least one processor operatively connected to at least one memory within a housing and a readable medium stored in the at least one memory, the readable medium comprised of executable code readable by the at least one processor of the communication terminal to process at least a portion of the readable medium such that at least one portion of status information is stored in a memory unit associated with the communication terminal; wherein said at least one portion of status information is comprised of a digital signature that is calculated from the status information by a first control unit associated with the communication terminal and is asymmetrically encoded using a private key of the first control unit, the first control unit being associated with the communication terminal for the resolution and/or conversion of network addresses; and wherein the communication terminal is also configured to determine if the first control unit has failed to properly update the at least one portion of status information and, if the first control unit fails, send a request to be transmitted to at least one second control unit to associate the communication terminal with the at least one second control unit, the request comprising the digital signature, the request configured to initiate a check of the digital signature by the at least one second control unit; and in the event of a positive check result, the communication terminal is configured to form an association with the at least one second control unit for the resolution and/or conversion of network addresses.

18. The communication terminal of claim 17 wherein the communication terminal is configured as a PC based communication terminal.

19. A method for operating a communication terminal for packet-oriented data transmission, the method comprising:

providing status information for a communication terminal, the status information comprising a digital signature calculated from status information of the communication terminal by a private key of a first control unit such that the digital signature is asymmetrically encoded, the first control unit being associated with the communication terminal for the resolution and/or conversion of network addresses;

storing the status information in a memory unit associated with the communication terminal;

transmitting a request to associate the communication terminal with at least one second control unit if the first control unit is determined to have failed to properly update the status information of the communication terminal, the request comprising the status information and the digital signature;

checking the digital signature with the at least one second control unit; and associating the communication terminal with the at least one second control unit if the checking of the digital signature results in a positive check result.

20. The method of claim 19 further comprising depositing the public key of the first control unit such that the at least one second control unit is able to access the public key and wherein the at least one second control unit is configured to access the public key of the first control unit to check the digital signature.

* * * * *